J. Frick,
Shutter Fastener.
No. 47,711. Patented May 16, 1865.
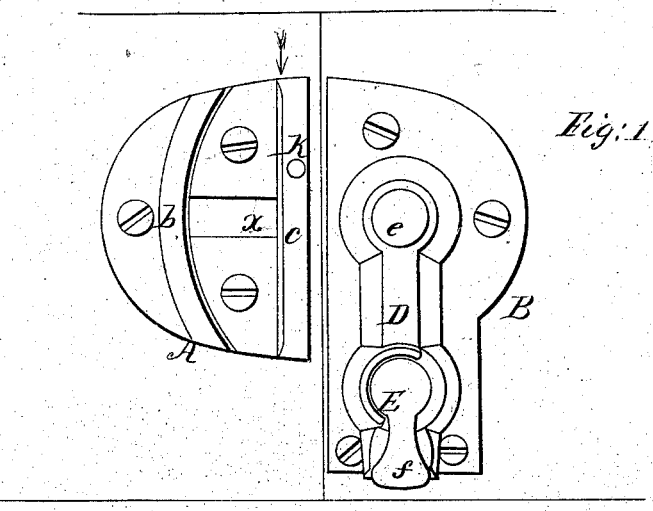
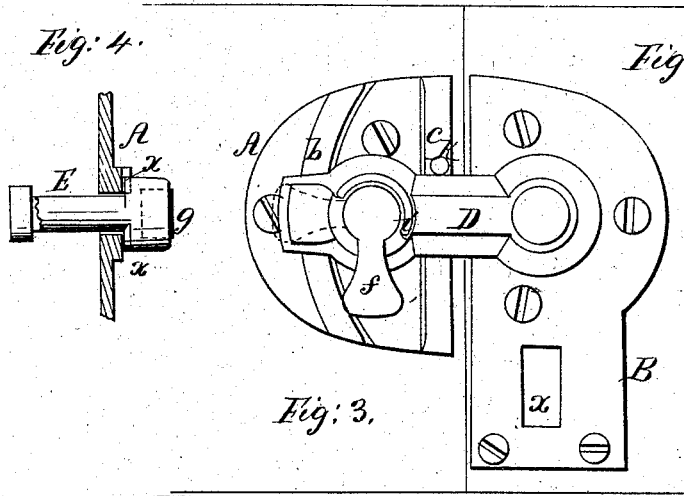
Witnesses:
Wm Albert Steel
N. P. Delany
Inventor:
Jacob Frick
By his Att'y
Henry Howson

UNITED STATES PATENT OFFICE.

JACOB FRICK, OF PHILADELPHIA, PENNSYLVANIA.

IMPROVED SHUTTER-FASTENING.

Specification forming part of Letters Patent No. 47,711, dated May 16, 1865.

*To all whom it may concern:*

Be it known that I, JACOB FRICK, of Philadelphia, Pennsylvania, have invented an Improved Shutter-Fastening; and I do hereby declare the following to be a full, clear, and exact description of the same, reference being had to the accompanying drawings, and to the letters of reference marked thereon.

My improved shutter-fastening, which is fully described hereinafter, has been designed with the view of firmly securing two shutters together and preventing the rattling of the same, the fastening itself being unaffected by exposure to the weather.

In order to enable others to make and use my invention, I will now proceed to describe its construction and operation.

On reference to the accompanying drawings, which form a part of this specification, Figures 1 and 2 are views of my improved shutter-fastener, showing the parts in different positions; Fig. 3, a view partly in section looking in the direction of the arrow, Fig. 1; and Fig. 4, a detached sectional view.

Similar letters refer to similar parts throughout the several views.

A is a plate, which is secured to the side of one shutter, near the edge of the same, and adjacent to a somewhat similar plate, B, which is secured to the other shutter.

On the plate A are the curved rib $b$ and straight rib $c$, and between the two is an oblong opening, X.

On the inside of the plate A, on each side of the opening X, is an inclined projection, $d$, the two projections being beveled in opposite directions, as shown in Fig. 3.

In the lower portion of the plate B is an oblong opening, X', and in the center of the plate is a pin, $e$, to which is hung one end of an arm, D. Through the arm D, near the outer end of the same, passes a rod, E, on one end of which is a handle, $f$, and on the other end a T-shaped head, $g$, the latter being so cut as to form two beveled shoulders, $x\ x$, adapted to the inclined projection $d\ d$, as shown in Fig. 3.

On the arm D is a semicircular or nearly semicircular rib, $i$, for limiting the movement of the rib $b$.

In an opening in the head $g$ of the spindle E is inserted a block of rubber or leather, and similar blocks of rubber or leather are also inserted in recesses in the under side of the arm D. From the rib $c$ projects a pin, $k$, for limiting the upward movement of the arm D.

When the shutters have to be fastened they are brought together, the arm C is raised until it strikes the pin K, the handle $f$ of the spindle E is brought to a position at right angles to that shown in Fig. 2, and the spindle is then pushed forward, so that its head may pass through the opening X in the plate A. The handle $f$ is then turned to the position shown in Fig. 2, when the inclined shoulders $x\ x$ of the head will be brought in contact with the inclined projections $d\ d$ on the under side of the plate A, the spindle being thereby drawn inward so as to confine the end of the arm D tightly between the handle $f$ and the ribs $b$ and $c$ on the plate A, thus securing the two portions of the shutter firmly together.

To unlock the fastening it is only necessary to turn the handle $f$ to the position shown in dotted lines, Fig. 2, and pull it outward, thereby withdrawing the head of the spindle E from the opening X, when the arm D will fall by its own weight to the position shown in Fig. 1. The head of the rod E may then be introduced into the opening K', the handle being brought to the position shown in Fig. 1, so as to lock the arm to the plate B.

By the introduction of blocks of rubber or other elastic material into recesses in the end of the head $g$ and in recesses in the arm D these parts are prevented from cutting or scratching the plate B as they move over the latter, and also serve the purpose of preventing the disagreeable rattling of the shutters.

It will be seen that in the device there are no parts which can be injuriously affected by exposure to the weather, there being no springs and other appliances liable to get out of order, and that the device is simple and efficient in its operation.

It should be understood that the slot X is considerably larger than the width of the head *g*, so that the shrinkage of one or both of the shutters may not render the fastening unserviceable.

I claim as my invention and desire to secure by Letters Patent—

The plate B, its arm D, spindle E, its head *g*, and inclined shoulders *x x*, in combination with the plate A and its slot X, the whole being arranged, operating, and adapted to shutters, substantially as and for the purpose herein set forth.

In testimony whereof I have signed my name to this specification in the presence of two subscribing witnesses.

JACOB FRICK.

Witnesses:
 JOHN WHITE,
 W. J. R. DELANY.